(12) United States Patent
Guey et al.

(10) Patent No.: US 7,449,794 B2
(45) Date of Patent: Nov. 11, 2008

(54) WIND TURBINE WITH SELF-CONTAINED POWER SYSTEM

(75) Inventors: Zen-Jey Guey, Hsinchu (TW); Yun-Yuan Chang, Taipei (TW); Ching-Huei Wu, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 0 days.

(21) Appl. No.: 11/889,493

(22) Filed: Aug. 14, 2007

(65) Prior Publication Data

US 2008/0143110 A1   Jun. 19, 2008

(30) Foreign Application Priority Data

Dec. 18, 2006   (TW) .............................. 95147400 A

(51) Int. Cl.
*F02N 11/06* (2006.01)

(52) U.S. Cl. ....................................................... 290/44
(58) Field of Classification Search .................... 290/55
See application file for complete search history.

(56) References Cited

U.S. PATENT DOCUMENTS

| | | | |
|---|---|---|---|
| 6,951,443 B1 * | 10/2005 | Blakemore | 415/4.3 |
| 7,071,578 B1 * | 7/2006 | Shibata et al. | 290/55 |
| 7,218,012 B1 * | 5/2007 | Edenfeld | 290/44 |
| 7,323,792 B2 * | 1/2008 | Sohn | 290/55 |
| 7,331,761 B2 * | 2/2008 | Hansen et al. | 416/11 |
| 2004/0151584 A1 * | 8/2004 | Blakemore | 416/9 |
| 2005/0207890 A1 * | 9/2005 | Shibata et al. | 416/132 B |
| 2007/0081896 A1 * | 4/2007 | Mollhagen | 416/98 |
| 2007/0104577 A1 * | 5/2007 | Hansen et al. | 416/104 |

* cited by examiner

*Primary Examiner*—Joseph Waks
(74) *Attorney, Agent, or Firm*—Reed Smith LLP; Stanley P. Fisher, Esq.; Juan Carlos A. Marquez, Esq.

(57) ABSTRACT

A wind turbine with a self-contained power system is disclosed. The self-contained power system comprises an auxiliary generator with a winding disposed on the rotor side while the magnetic poles of the auxiliary generator are disposed at components moving relatively to the rotation of the rotor. Thereby, a back electromotive force (emf) is generated in the winding due to the relative motion of the winding with respect to the magnetic poles as the rotor is rotating, and consequently the self-contained power system generates electricity to provide the power for driving the rotor to rotate. Therefore, the ability of the wind turbine to operate independently is enhanced since the amount of back-up power supply required is reduced and the structure of the wind turbine is simplified. Therefore the cost of the wind turbine is reduced, and the system reliability is increased.

8 Claims, 2 Drawing Sheets

WIND TURBINE WITH SELF-CONTAINED POWER SYSTEM

BACKGROUND OF THE INVENTION

1. Field of the Invention

The present invention generally relates to a wind turbine with a self-contained power system and, more particularly, to a wind turbine with a self-contained power system comprising an auxiliary generator with a winding disposed on the hub of the wind turbine while the magnetic poles of the auxiliary generator are disposed at a mechanism which is rotating relatively to the rotor. Thereby, a back electromotive force (emf) is generated in the winding due to the relative motion of the winding with respect to the magnetic poles as the rotor is rotating, and consequently the self-contained power system generates electricity to provide the power for tuning the blades' pitch angles.

2. Description of the Prior Art

For a large-size wind turbine, the output power can be adjusted by the blade by means of passive stall, active stall and pitch regulation. Pitch regulation used with a variable-speed generator exhibits the best controllability and is widely used in large-size wind turbines.

Pitch regulation can use hydraulic or electric pitch drives. However, with the increase of the output power of a large-size wind turbine, the electric pitch drive has advantages over the hydraulic pitch drive because the former has more flexibility in power adjustment without leakage problem.

Please refer to FIG. 1, which is a schematic diagram of a prevailing pitch regulated wind turbine. The wind turbine 10 comprises a nacelle 12 disposed on a tower 11. A rotor 13 is connected to the nacelle 12. The rotor 13 has a plurality of blades 132 disposed around the circumference of a hub 131. The nacelle 12 includes a gearbox 15 and a generator 17 and other components such as a power converter and a wind turbine controller (not shown). Via the gearbox 15, the variable-speed generator 17 is indirectly coupled to the hub 131 and is controlled by the power converter and the wind turbine controller. Each of the blades 132 is connected to a pitch drive 133 residing inside the hub 131. The pitch drive 133 generally comprises at least a gear set, a motor and a driver (not shown) so as to regulate the pitch angle of the blade 132 and adjust the wind power collected by the blades 132. The hub 131 is connected to the gearbox 15 by way of a shaft 14 disposed in the nacelle 12. As the rotor 13 is a rotating structure, the pitch drive 133 in the hub 131 cannot be rigidly interfaced with the nacelle 12 using fixed connecting wires. Therefore, a slip ring 16 is required on the shaft 14 for connecting the hub 131 and the nacelle 12, so the transmission line 163 can be disposed unrestrictedly. Moreover, a back-up power supply 134 is installed in the hub 131 so as to provide sufficient power for the pitch drives 133 when the power system is at faulty condition.

Accordingly, the large-sized wind turbine relies on the power system or the back-up power supply even though it generates considerable amount of electricity. In other words, the large-sized wind turbine still replies on another power supply even though it is a power generator. On the other hand, the power provided from the slip ring 16 increases with the output power of the wind turbine, and therefore the power required by the pitch drive increases. The specification of the slip ring has to be adjusted according to the power rating and maintenance so as to meet the requirements in reliability of the wind turbine.

Therefore, it is crucial to provide a wind turbine with a self-contained power system so as to enhance the standalone operation ability of the wind turbine and reduce the capacity of the back-up power supply.

SUMMARY OF THE INVENTION

It is an object of the present invention to provide a wind turbine with a self-contained power system using an auxiliary generator disposed on a rotor so as to provide the pitch drive with sufficient power. Therefore, standalone operation ability of the wind turbine is enhanced and the number of back-up power supplies is reduced.

In order to achieve the foregoing object, the present invention provides a wind turbine with a self-contained power system comprising:

a nacelle comprising a variable-speed generator coupled to a hub, a power converter and a wind turbine controller regulating the variable-speed generator using the power converter;

a rotor comprising the hub and a plurality of blades, the rotor being driven to rotate and move relatively to the nacelle; and an auxiliary generator disposed on the interface between the rotor side and the nacelle side so as to provide the pitch drive with sufficient power, the auxiliary generator further comprising:

a winding disposed on the rotor side; and an even number of magnetic poles, disposed on the nacelle side facing the winding;

whereby, a back electromotive force (emf) is generated in the winding due to the relative motion of the rotor with respect to the nacelle as the rotor is rotating.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention providing a wind turbine with a self-contained power system can be exemplified by the preferred embodiment as described hereinafter.

Figure 1:
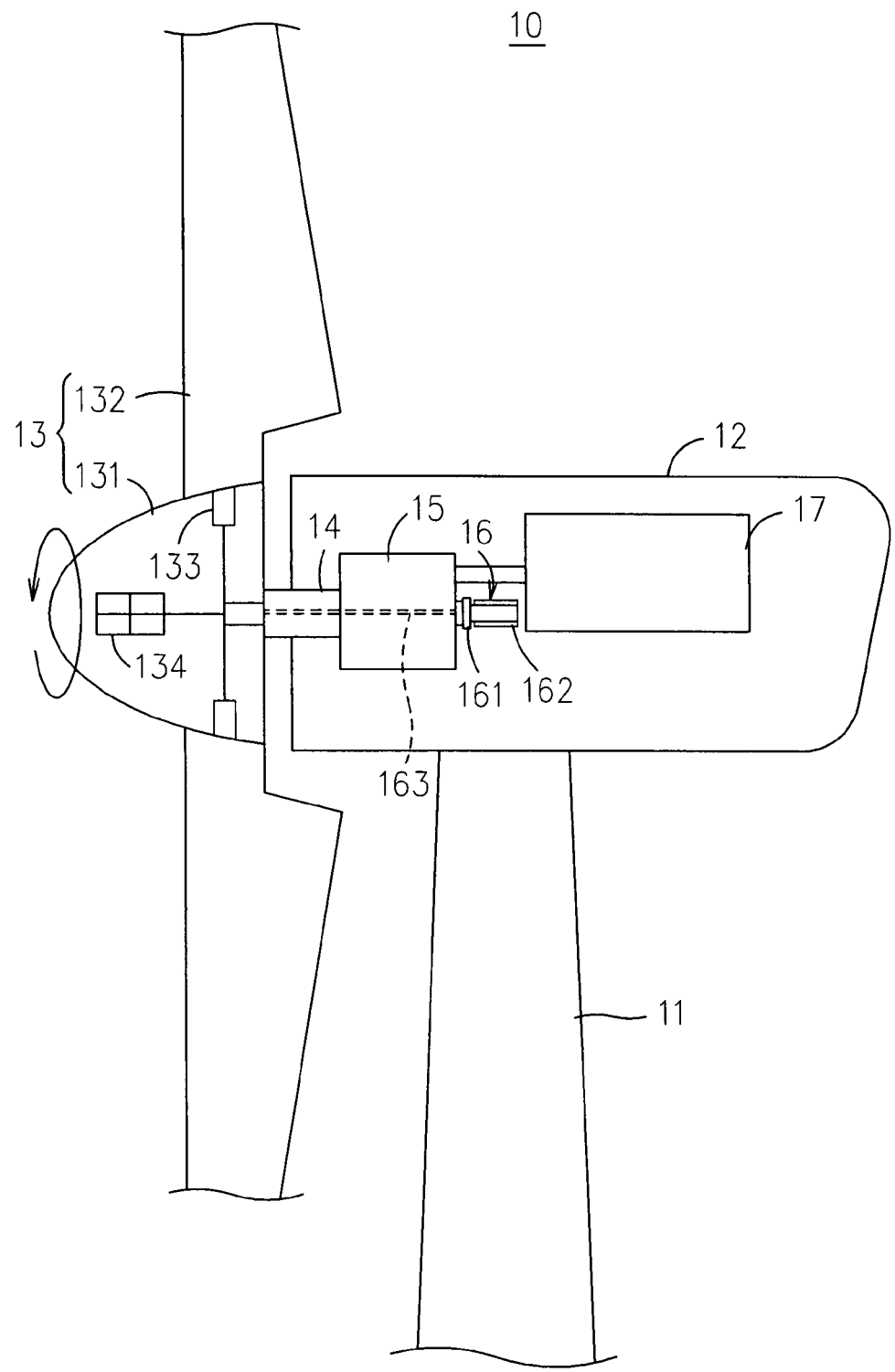
FIG. 1 is a schematic diagram of a prevailing pitch regulated wind turbine.
Figure 2:
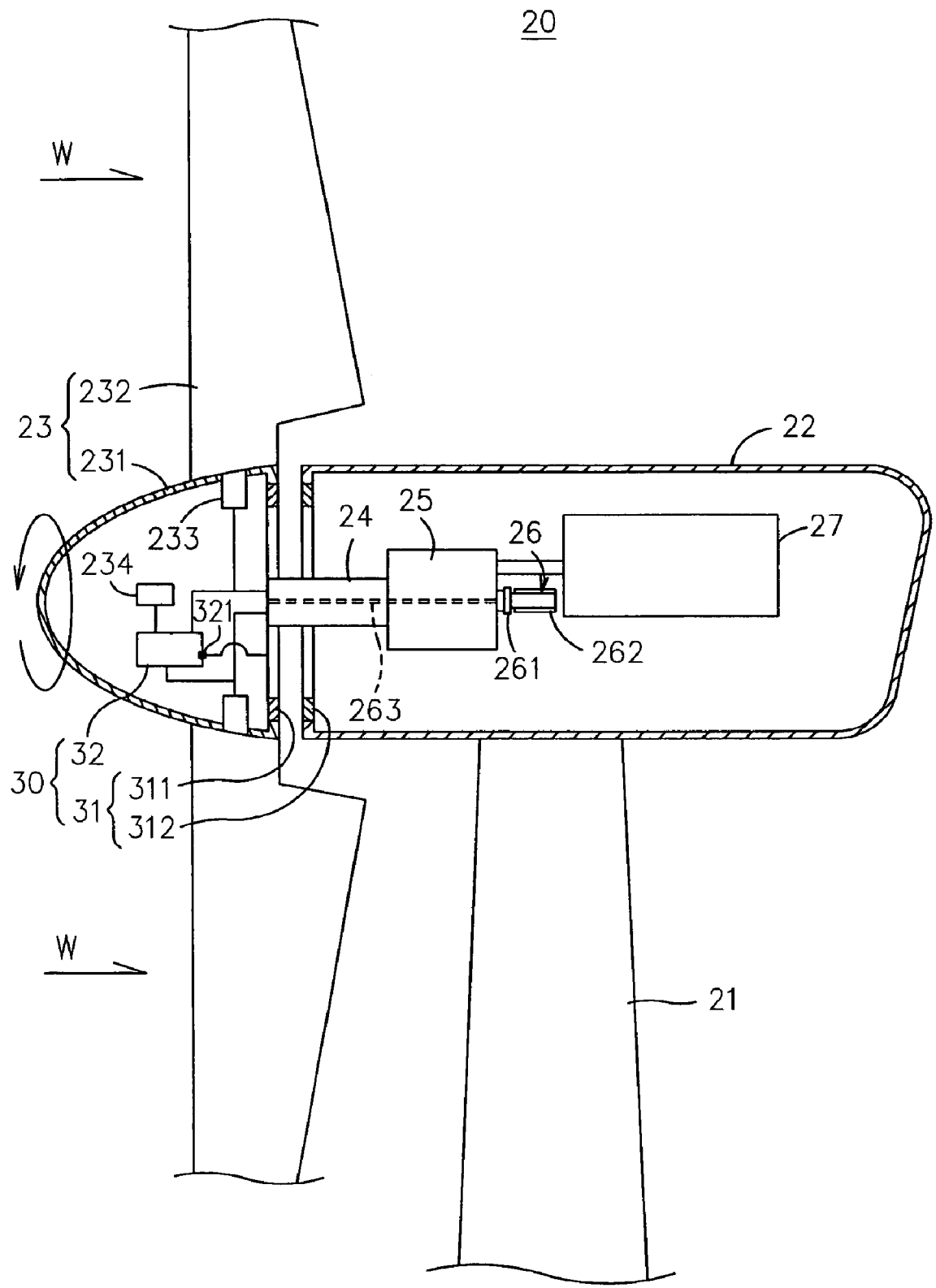
FIG. 2 is a schematic diagram of a wind turbine with a self-contained power system according to one embodiment of the present invention.

Please refer to FIG. 2, which is a schematic diagram of a wind turbine with a self-contained power system according to one embodiment of the present invention. It should be noted that the present invention is not limited to any of the exemplary examples described in this specification. In FIG. 2, the wind turbine 20 comprises a nacelle 22 disposed on a tower 21. A rotor 23 is connected to the nacelle 22. The rotor 23 has a plurality of blades 232 disposed around the circumference of a hub 231. The rotor 23 is driven by wind power W. Each of the blades 232 is connected to a pitch drive 233 residing inside the hub 231. The pitch drive 233 generally comprises at least a gear set, a motor and a driver (not shown) so as to adjust the pitch angles of the blades 232 and regulate the wind power collected by the blades 232. As the rotor 23 rotates, the shaft 24 is driven to rotate.

The nacelle 22 further comprises a set-up gearbox 25, a slip ring 26, a variable-speed generator 27 and other components such as a power converter and a wind turbine controller (not shown). The variable-speed generator 27 is directly or indirectly coupled to the hub 231 and is controlled by the power converter and the wind turbine controller. In the present embodiment, the gearbox 25 is connected to the hub 231 of the rotor 23 by way of the shaft 24. As the rotor 23 is a rotating structure, the pitch drive 233 in the hub 231 cannot be interfaced to the nacelle 22 using fixed connecting wires. Therefore, the slip ring 26 is required on the shaft 24 for connecting the hub 231 and the nacelle 22. The slip ring 26 transmits the electric signal to the pitch drives through the hollow shaft of the gearbox 25 by way of a transmission line 263 so as to control the pitch drive 233 to regulate the pitch of the blades 232.

The present invention is characterized in that the variable-speed generator 27 receives the power from the external power grid so as to provide the internal components inside the nacelle 22 with sufficient energy. The power for driving the pitch drive 233 is principally provided from a self-contained power system 30 installed on the rotor side, separated from the nacelle 27. In other words, the slip ring 26 need not deliver power. It only transmit electric signals from the controller 28.

The self-contained power system 30, providing the pitch drive 233 with power, comprises an auxiliary generator 31 and a power supply 32. The auxiliary generator 31 comprises a winding 311 and an even number of magnetic poles 312. The winding 311 is disposed on the rotor side facing the nacelle 22. The magnetic poles 312 are disposed on the nacelle side facing the winding 311. The power supply 32 is disposed inside the hub 231 and is connected to the pitch drive 233 and a back-up power supply 234 inside the hub 231. The back-up power supply comprises of batteries, or super-capacitors or combination thereof for energy storage.

As the rotor 23 rotates with wind power W, the hub 231 rotates relative to the nacelle 22. Since the winding 311 and the magnetic poles 312 are disposed facing each other on the hub 231 and the nacelle 22, respectively. A back electromotive force (emf) is generated in the winding 311 due to the relative motion of the magnetic poles 312. The back electromotive force (emf) is then delivered to the power supply 32 to convert the back electromotive force (emf) into electric power for the pitch drive 233 and the back-up power supply 234. In other words, the pitch drive 233 uses power from an auxiliary generator 31 instead of the variable-speed generator 27 in the nacelle 22.

Compared with the prior art where the pitch drive relies on external power supply, the wind turbine of the present invention uses a rotor 23 rotating relative to the nacelle 22. Therefore, the self-contained power system 30 provides the pitch drive 233 with sufficient power even though the power grid is at faulty condition. When the self-contained power system 30 cannot function to provide electricity because the rotor 23 rotates too slowly or even stops as the wind turbine starts from idling to normal operation, the pitch drive 233 still can consume power from the back-up power supply 234 installed inside the hub 231. Moreover, as long as the power grid functions normally, the controller 28 uses the power from the power grid to control the auxiliary generator 31 in an operation mode so as to drive the rotor 23 to rotate and activate the self-contained power system 30. Therefore, the number of back-up power supplies 234 required can be reduced.

Accordingly, the present invention has advantages described hereinafter:

1. higher operation capability and reliability of the wind turbine because the pitch drive uses the power from the self-contained power system instead of the power from the nacelle side through the slip ring;
2. the specification the slip ring does not need to be changed even when the output power of the wind turbine is changed since the slip ring only delivers electric signals; and
3. the number of back-up power supplies required can be reduced because the self-contained power system can operate normally to provide power using the motion of the hub relative to the nacelle as long as the power grid functions normally.

It is also noted that, in one embodiment, the winding 311 is disposed on the rotor 23 and the magnetic poles 312 are disposed on the nacelle 22 facing the rotor 23. However, the present invention is not limited to the embodiment. The winding 311 and the magnetic poles 312 can be disposed in any other way as long as the magnetic poles 312 rotate relative to the rotor. The disclosure of the present invention can also be applied in hydro power or any other fields.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A wind turbine with a self-contained power system, comprising:
    a nacelle comprising a variable-speed generator directly or indirectly coupled to a hub, a power converter and a wind turbine controller regulating the variable-speed generator using the power converter;
    a rotor comprising the hub and a plurality of blades, the rotor being driven to rotate and move relatively to the nacelle; and
    an auxiliary generator disposed on the interface between the rotor side and the nacelle side so as to provide the rotor with sufficient power, the auxiliary generator further comprising:
    a winding disposed on the rotor side; and
    an even number of magnetic poles, disposed on the nacelle side facing correspondingly to the winding;
    whereby, a back electromotive force (emf) is generated in the winding due to the relative motion of the rotor with respect to the nacelle as the rotor is rotating;
    a power supply with an input terminal capable of receiving the back electromotive force (emf) from the winding and the magnetic poles and converting the back electromotive force (emf) into electric power, wherein the power supply is connected to a back-up power supply capable of storing power.

2. The wind turbine with a self-contained power system as recited in claim 1, wherein the power supply is connected to a driving system for adjusting the blades so that the power supply provides the driving system with required operation power.

3. The wind turbine with a self-contained power system as recited in claim 1, wherein the gear set is a reduction gear set.

4. The wind turbine with a self-contained power system as recited in claim 1, wherein the back-up power supply includes batteries, or super-capacitors, or combination thereof.

5. The wind turbine with a self-contained power system as recited in claim 1, wherein the nacelle comprises:
    a controller capable of controlling the self-contained power system;

a gear set, coupled to the rotor for transforming the rotation rate of the rotor; and a slip ring for installing a transmission line for transmitting electric signals from the controller to a hub side.

6. The wind turbine with a self-contained power system as recited in claim 1, wherein the winding is disposed on the hub facing the nacelle.

7. The wind turbine with a self-contained power system as recited in claim 1, wherein the auxiliary generator is of axial air-gap type.

8. The wind turbine with a self-contained power system as recited in claim 1, wherein the rotor is driven by wind power or hydro power.

\* \* \* \* \*